No. 851,652. PATENTED APR. 30, 1907.
J. L. COUTTS.
BELT THROWER AND GUIDE.
APPLICATION FILED JAN. 2, 1907.
3 SHEETS—SHEET 1.
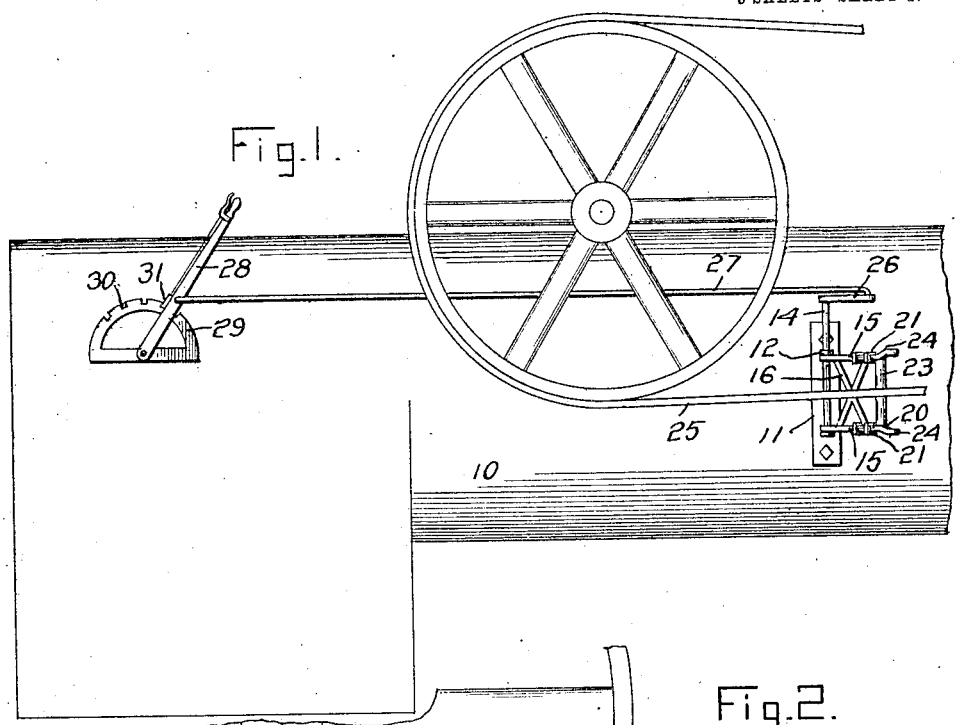
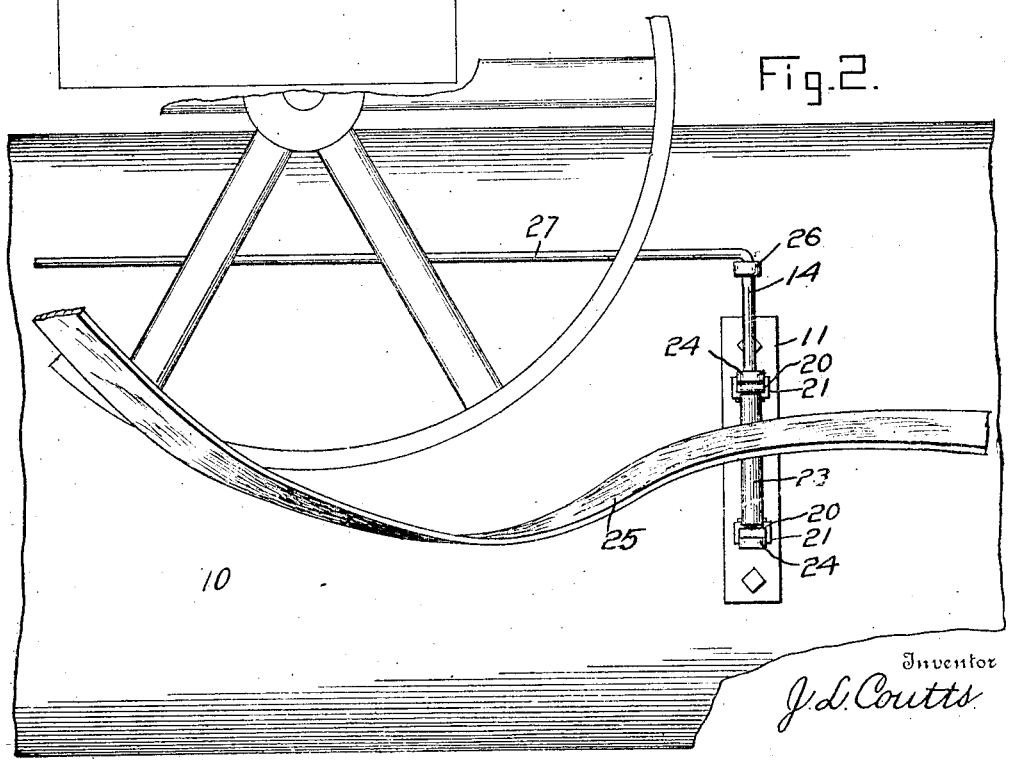
Witnesses
C. K. Reichenbach
F. G. Smith
Inventor
J. L. Coutts
By
Attorneys No. 851,652. PATENTED APR. 30, 1907.
J. L. COUTTS.
BELT THROWER AND GUIDE.
APPLICATION FILED JAN. 2, 1907.

3 SHEETS—SHEET 2.

No. 851,652. PATENTED APR. 30, 1907.
J. L. COUTTS.
BELT THROWER AND GUIDE.
APPLICATION FILED JAN. 2, 1907.
3 SHEETS—SHEET 3.
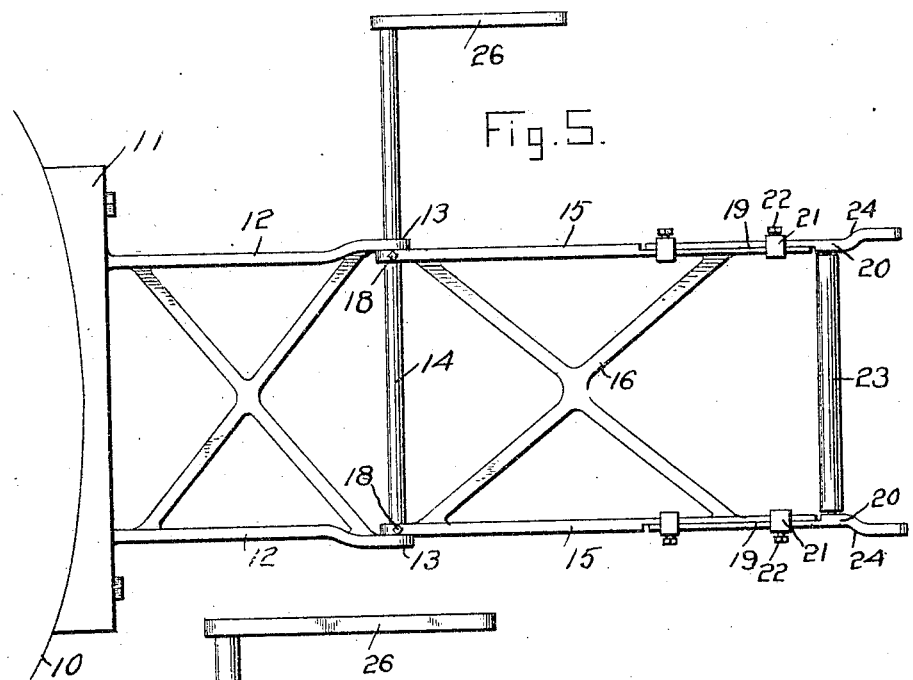
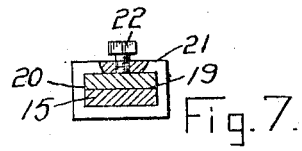
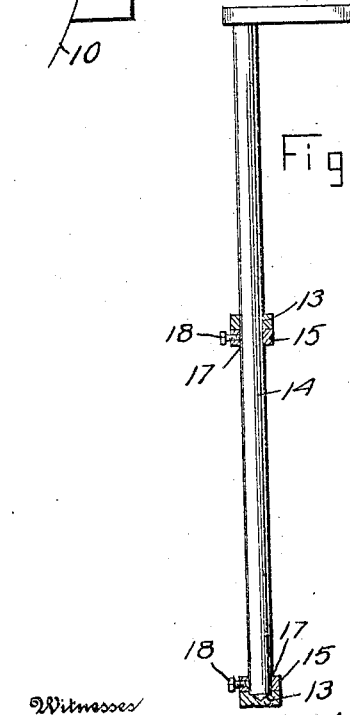

UNITED STATES PATENT OFFICE.

JOHN L. COUTTS, OF COLTON, SOUTH DAKOTA.

BELT THROWER AND GUIDE.

No. 851,652.      Specification of Letters Patent.      Patented April 30, 1907.

Application filed January 2, 1907. Serial No. 350,457.

*To all whom it may concern:*

Be it known that I, JOHN L. COUTTS, a citizen of the United States, residing at Colton, in the county of Minnehaha, State of South Dakota, have invented certain new and useful Improvements in Belt Throwers and Guides; and I do hereby declare the following to be a full, clear, and exact description of the invention, such as will enable others skilled in the art to which it appertains to make and use the same.

This invention relates to belt throwers and more particularly to that class designed for use upon a traction engine to throw the belt from the drive pulley in case it is desired to suddenly stop the mechanism of the threshing machine.

One of the most important features of my invention resides in the provision of a belt thrower of such construction that it will guide the belt in windy weather and prevent the belt from shifting into engagement with the mechanism of the engine, and a further feature of the invention resides in the fact that the belt thrower mechanism is adjustable so that it may be used upon any size engines and regardless of the location of the belt with respect to the boiler casing.

Figure 3:
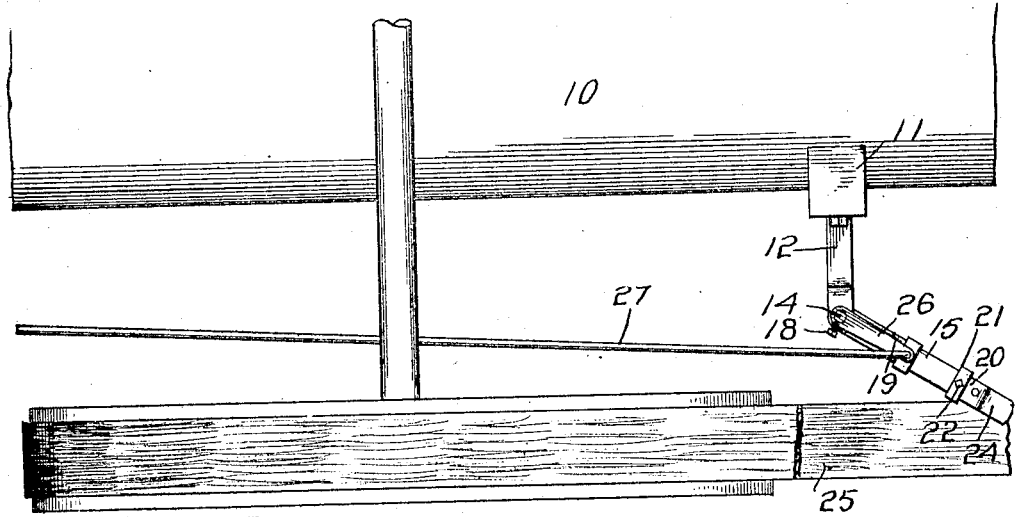
Figure 4:
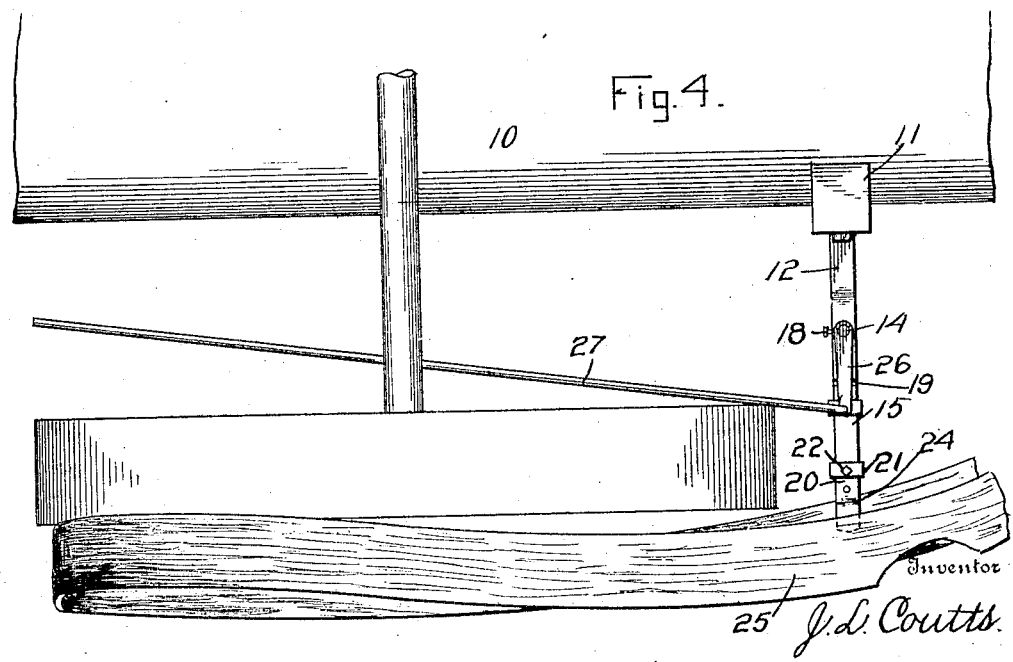

In the accompanying drawings—Figure 1 is a side elevation of a traction engine showing my mechanism applied thereto and showing the arrangement of the parts before the belt is thrown, Fig. 2 is a similar view showing the position of the parts at the time of throwing the belt, Fig. 3 is a top plan view of a portion of the engine showing the position of the parts of the belt thrower before the belt is thrown, Fig. 4 is a view similar to Fig. 3 showing the position of the parts at the time the belt is thrown, Fig. 5 is a view in side elevation of my belt thrower mechanism whereby the same may be adjusted, Fig. 6 is a detail vertical sectional view through the vertical shaft upon which the frame which carries the belt engaging roller is secured, and Fig. 7 is a similar view through a portion of the frame showing the means whereby the same may be adjusted.

Referring more specifically to the drawings the numeral 10 denotes the boiler casing of a traction engine and 11 a bracket which is bolted thereto and which includes upper and lower arms 12 which extend directly outwardly from the said casing. These arms are braced and are provided at their outer or free ends with bearings 13 for the rotatable reception of a vertical shaft 14. The belt engaging roller carrying frame of the belt thrower mechanism comprises upper and lower arms 15 which are connected by crossed braces 16 and which are provided at their inner ends with enlargements through which are formed openings 17 through which the vertical shaft 14 is engaged and through these enlargements are engaged set screws 18 which impinge against the said shaft and serve to hold the frame at any desired angle, normally, with respect to the boiler casing of the traction engine. From a point adjacent their middle and extending to their outer or free ends, the arms 15 are halved or cut away as at 19 for the reception of similarly formed arms 20 and around the cut away portion of the arms 15 and 20 are engaged collars 21 carrying set screws 22 which serve to securely hold these portions of the arms in connected relation, there being preferably a pair of such collars and set screws engaged upon each set of arms.

A roller 23 is journaled at its ends in the arms 20 and serves to connect the said arms and from the point at which the ends of this roller are connected with the arms, the said arms are curved upwardly and downwardly from each other as at 24 to serve as guide fingers for the belt, which belt is denoted by the numeral 25.

From the foregoing it will be readily understood that the roller 23 is positioned so as to barely engage the adjacent edge of the belt 25, this engagement being had by adjusting the arms 20 with respect to the arms 15 and the curved portions 24 of the arms will serve to guide the belt or in other words to prevent improper movement of the belt.

The vertical shaft 14 extends considerably above the upper arm 12 and to the upper end of the shaft is connected an arm 26 which extends outwardly from the traction engine and from one end of which is connected one end of a connecting rod 27, the other end of the connecting rod being pivotally connected with a lever 28. This lever 28 is pivoted to a segmental rack 29 which is fixedly secured upon the boiler casing for the engine and which is provided with notches 30 for the engagement therewith of a hand operative pawl mechanism 31 carried by the lever.

It will now be understood that in case the belt is located a considerable distance from the boiler casing of the traction engine the arms 20 may be adjusted with respect to the arms 15 and if necessary the lever may be normally moved to a certain point to properly position the belt engaging roller 23, and it will further be understood that when it is desired to throw the belt the lever 28 is quickly swung rearwardly thereby swinging the frame constituted of the arms 15 outwardly so that the roller 23 will engage the belt and force the same from its drive pulley.

What is claimed is—

A device of the type set forth comprising a stationary frame including spaced parallel horizontal arms, a shaft journaled in the ends of said arms, a second frame comprising parallel horizontal arms having apertured ends surrounding said shaft, set screws threaded through said ends for frictional engagement with said shaft, arms mounted upon the ends of the arms of said second frame for slidable adjustment, means for clamping said last named arms at selected positions upon the arms of said second frame, and a vertical roller having its ends journaled in said last named arms.

In testimony whereof, I affix my signature, in presence of two witnesses.

JOHN L. COUTTS.

Witnesses:
 PETER MEDINGER,
 EIRNEST H. COUTTS.